United States Patent [19]

Shimazaki

[11] Patent Number: 5,051,842
[45] Date of Patent: Sep. 24, 1991

[54] IMAGE PROCESSING APPARATUS FOR MIXING WEIGHTED CONTINUOUS-TONE AND UNSHARP IMAGE SIGNALS TO REDUCE VISIBLE NOISE IN REPRODUCED IMAGES

[75] Inventor: Osamu Shimazaki, Kanagawa, Japan

[73] Assignee: Fuji Photo Film Co., Ltd., Kanagawa, Japan

[21] Appl. No.: 509,840

[22] Filed: Apr. 17, 1990

[30] Foreign Application Priority Data

Apr. 19, 1989 [JP] Japan .................................. 1-99763

[51] Int. Cl.$^5$ .............................................. H04N 1/40
[52] U.S. Cl. .................................. 358/447; 358/463; 358/461
[58] Field of Search ................ 358/298, 447, 443, 448, 358/455, 456, 461, 463, 296, 401

[56] References Cited

U.S. PATENT DOCUMENTS 4,972,256 11/1990 Hirosawa ............................. 358/447

Primary Examiner—Benjamin R. Fuller
Assistant Examiner—Scott A. Rogers
Attorney, Agent, or Firm—Sughrue, Mion, Zinn, Macpeak & Seas

[57] ABSTRACT

An image processing apparatus comprises an unsharp signal generating means for processing image signals S obtained from continuous-tone images for average so as to generate unsharp signals U, a weighted parameter generating means for generating weighted parameters P and Q according to the level of the image signals S and the level of the unsharp signals U and an image signal producing means for producing an image signal T according to the following equation:

$$T = P \cdot U + Q \cdot S$$

where
S is an image signal, U is an unsharp signal and
P and Q are weighted parameters.

The unsharp signal generating means comprises an addition averaging circuit for adding the image signals S corresponding to an even number of pixels arranged to form a continuous-tone image to be scanned in a main scanning direction and for processing the added signals for average, thereby to generate unsharp signals U. The unsharp signal generating means includes a look-up table for establishing the weighted parameters P and Q according to increase in the level of either one of an image signal S and an unsharp signal U and for selecting the weighted parameters P and Q corresponding to the level of the image signal S and unsharp signal U.

6 Claims, 5 Drawing Sheets

IMAGE PROCESSING APPARATUS FOR MIXING WEIGHTED CONTINUOUS-TONE AND UNSHARP IMAGE SIGNALS TO REDUCE VISIBLE NOISE IN REPRODUCED IMAGES

BACKGROUND OF THE INVENTION

FIELD OF THE INVENTION

The present invention relates to an image processing apparatus, and more specifically to an image processing apparatus wherein image signals obtained from a continuous-tone image and unsharp signals produced from the image signals are mixed together using each of weighted parameters to be selected according to the level of density of the continuous-tone image, thereby to enable noise to be appropriately reduced over a wide range from a shadow area to a highlight when the continuous-tone image is reproduced using the mixed image signals.

Where the continuous-tone image is converted into an electric signal by an solid-state image sensing device such as a CCD, followed by reproduction of the converted signal on a photographic film or the like, noise may enter a reproduced image owing to operation of the solid-state image sensing device. There has thus been known an image processing method for averaging image signals as electric signals with a view toward reducing the visible level of such noise.

When level regions of total density of the continuous-tone image are averaged so as to produce the averaged result, the reduction in the visible level of noise is achieved. However, such a process develops inconvenience such as reduction in resolution at the highlight, i.e., the lightest spot or area of the continuous-tone image. In other words, the human vision has a characteristic with low spatial resolution at the shadow area of the continuous-tone image, while it has a characteristic with high resolution at the highlight. Accordingly, the noise does not appear appreciably at the shadow area, while the visible level of the noise and the resolution are reduced at the highlight.

In an apparatus which has been disclosed in Japanese Patent Laid-Open No. 63-156475, it has thus been practiced to process the above-described image signals for average only on the side of the shadow area at the density level regions of a continuous-tone image. In other words, in such a prior art, each of the image signals obtained based on the continuous-tone image is compared with a predetermined threshold value established between the shadow area and highlight and image signals at the shadow area are processed for average based on the result of comparison. At this time, images with no appreciable noise are obtained, on the side of the shadow area of a reproduced image, from the averaged image signals. To the contrary, images free from reduction in resolution are obtained because the image signals at the highlight are not processed for average.

However, in this prior art, a judgment is made as to whether or not the image signals should be processed for average by comparing each of the image signals with one threshold value or several threshold values. As a consequence, the resultant reproduced image will develop an areas with an abrupt change in smoothness or sharpness of the image, in areas at the instance of changing from the shadow area to the highlight. In particular, an image having a gentle change in the density gives rise to inconvenience that it develops unnaturalness on the image before and after the threshold value or one of the several threshold values referred to above.

SUMMARY OF THE INVENTION

It is a principal object of the present invention to provide an image processing apparatus of a type wherein each of image signals and each unsharp signal obtained by processing the image signals for average are mixed together in a predetermined proportion using weighted parameters to be selected according to the level of image signal, thereby to make it possible to suitably reduce the visible level of noise over a wide range from a shadow area to a highlight, specifically to obtain an image free from unnaturalness with respect to an image having a gentle change in the density and further to undevelop the reduction in resolution at the highlight, where a continuous-tone image is reproduced using the mixed image signals.

Another object of the present invention is to provide an image processing apparatus, comprising unsharp signal generating means for processing image signals S obtained from continuous-tone images for average so as to generate unsharp signals U, weighted parameter generating means for generating weighted parameters P and Q according to the level of image signal S or the level of unsharp signal U, and image signal producing means for producing the new image signal T in accordance with the following equation:

$$T = P \cdot U + Q \cdot S$$

where
S is an image signal
U is an unsharp signal
P and Q are weighted parameters.

A further object of the present invention is to provide an image processing apparatus wherein the unsharp signal generating means comprises an addition averaging circuit for adding image signals S corresponding to an even number of pixels arranged to form a continuous-tone image to be scanned in a main scanning direction and for processing the added signals for average, thereby to generate unsharp signals U.

A still further object of the present invention is to provide an image processing apparatus wherein the unsharp signal generating means comprises an addition averaging circuit for adding the image signals S corresponding to the even number of pixels arranged to form the continuous-tone image to be scanned in a main scanning direction and image signals S corresponding to an even number of pixels arranged to form a continuous-tone image to be scanned in an auxiliary scanning direction and for processing the added signals for average, thereby to generate unsharp signals U.

A still further object of the present invention is to provide an image processing apparatus wherein the weighted parameter generating means comprises a look-up table of a type wherein the weighted parameter P is established such that it indicates zero as long as the level of each of the image signals S increases from zero to a certain value $D_H$ on the side of a highlight, it gradually approaches one as long as its level increases from the certain value $D_H$ to a certain value $D_S$ on the side of a shadow area and it indicates one as long as its level increases from the certain value $D_S$ to over $D_S$, and the weighted parameter Q is established such that it indicates one as long as the level of each of the image signals S increases from zero to the certain value $D_H$, it gradually approaches zero as long as its level increases from the certain value $D_H$ to the certain value $D_S$ and it indicates zero as long as its level increases from the certain value $D_S$ to over $D_S$, whereby the weighted parameters P and Q are selected depending on the level of each of the image signals S.

A still further object of the present invention is to provide an image processing apparatus wherein the weighted parameter generating means comprises a look-up table of a type wherein the weighted parameter P is established such that it indicates zero as long as the level of each of unsharp signals U increases from zero to a certain value $D_H$ on the side of a highlight, it gradually approaches one as long as its level increases from the certain value $D_H$ to a certain value $D_S$ on the side of a shadow area and it indicates one as long as its level increases from the certain value $D_S$ to over $D_S$, and the weighted parameter Q is established such that it indicates one as long as the level of each of the image signals U increases from zero to the certain value $D_H$, it gradually approaches zero as long as its level increases from the certain value $D_H$ to the certain value $D_S$ and it indicates zero as long as its level increases from the certain value $D_S$ to over $D_S$, whereby the weighted parameters P and Q are selected depending on the level of each of the unsharp signals U.

A still further object of the present invention is to provide an image processing apparatus wherein the weighted parameter generating means comprises the look-up table for establishing the weighted parameters P and Q as expressed by the following equations and for selecting the weight parameters P and Q according to the image signals S, $$P(S) = -K$$

$$Q(S) = 1 + K$$

where K is a sharpness parameter of each image signal S.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
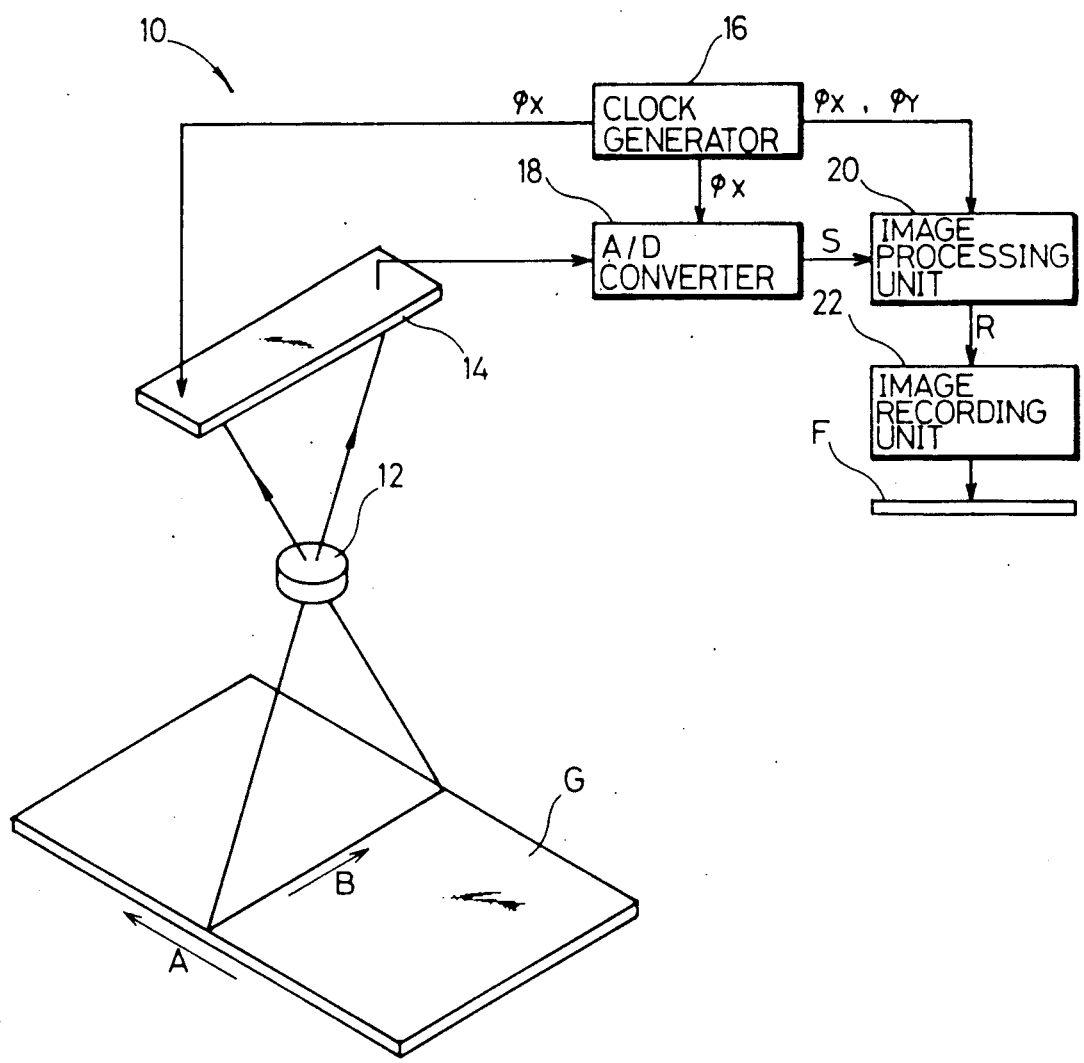
FIG. 1 is a simplified block diagram of an image reading and recording system to which an image processing apparatus according to the present invention is applied.

Referring now to FIG. 1, designated at numeral 10 is an image reading and recording system to which an image processing apparatus according to the present embodiment is applied. In the image reading and recording system 10, continuous-tone images each of which is recorded on an original G is converted into an electric signal, followed by reproduction of the same as a halftone dot image on a photographic film F.

In other words, the original G is fed in an auxiliary scanning direction indicated by the arrow A by an unillustrated feeding means. The continuous-tone image recorded on the original G is scanned in a main scanning direction indicated by the arrow B by a CCD 14 as a photoelectric converting means through a beam-condensing optical system 12. Each continuous-tone image, which has photoelectrically been converted by the CCD 14, is converted into each of image signals S in the form of a digital signal by an A/D converter 18 based on a main scanning clock signal $\phi_X$ from a clock generator 16, and thereafter supplied to the image processing unit 20. Then, each image signal S is subjected to image processing such as average processing, sharpness emphasis processing, halftone separation processing, etc. based on the main scanning clock signal $\phi_X$ and an auxiliary scanning clock signal $\phi_Y$ from the clock generator 16, and the signal thus processed is supplied as a halftone dot image signal R represented in the binary form to an image recording unit 22. The image recording unit 22 serves to convert the halftone dot image signal R into a light signal such as a laser beam signal for bringing the signal thus converted on a photographic signal F, thereby recording a halftone dot image.

Figure 2:
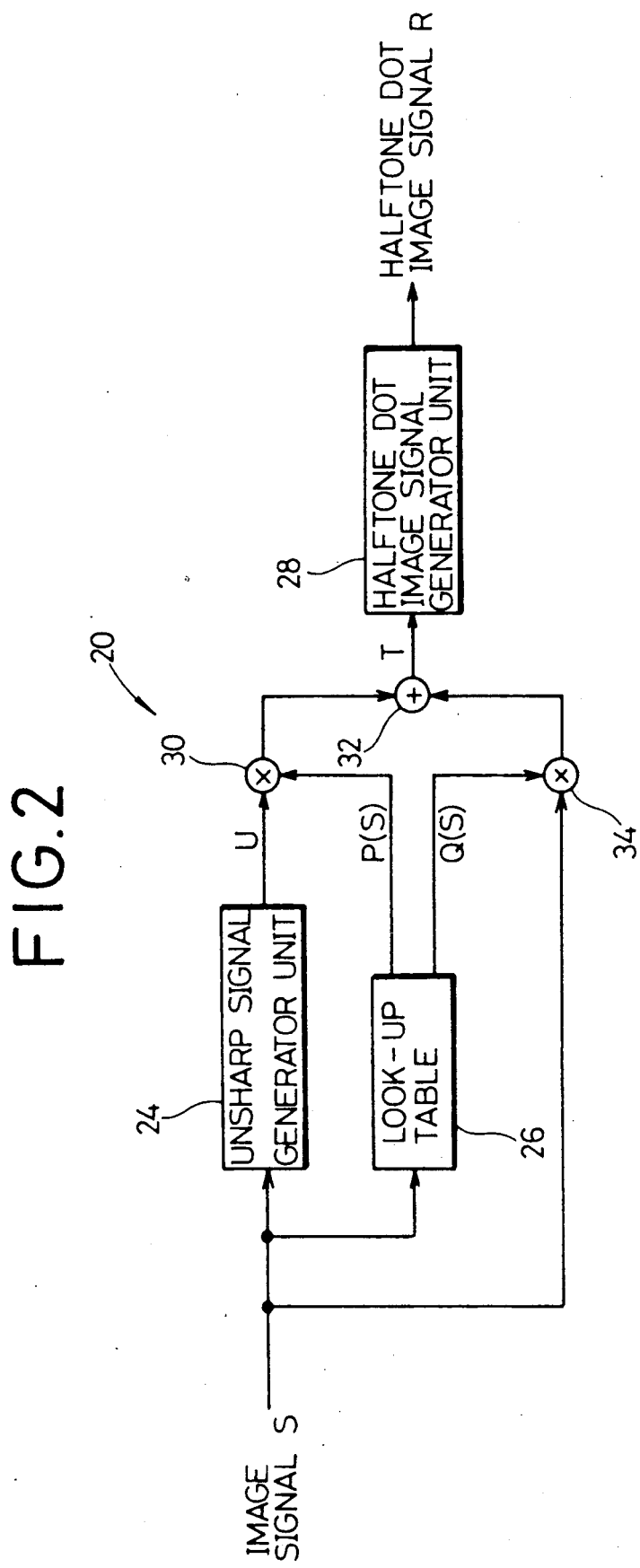
FIG. 2 is a block diagram showing the construction of an image processing unit shown in FIG. 1.

FIG. 2 shows the construction of the image processing unit 20 depicted in FIG. 1. In the same drawing, the image processing unit 20 is provided with an unsharp signal generator unit 24, a look-up table 26 and a halftone dot image signal generator unit 28. The unsharp signal generator unit 24 serves to process each image signal S for average so as to generate each of unsharp signals U. The look-up table 26 functions as a weighted parameter generating means and generates weighted parameters P(S) and Q(S) having characteristics shown in FIG. 3 based on each image signal S. Here, P(S) and Q(S) indicate that the parameters P and Q are a function of the image signal S.

In other words, the weighted parameter P(S) indicates zero as long as the level of each image signal S increases from zero to $D_H$ on the side of a highlight, i.e., the lightest spot or area, and it gradually reaches one for a period during which its level increases from $D_H$ to $D_S$ on the side of a shadow area. The parameter P(S) is also set as a function representative of 1 as long as its level increases from $D_S$ to over $D_S$. Further, the weighted parameter Q(S) indicates one for a period during which the level of each of the image signals S increases from zero to $D_H$ and it gradually reaches zero for a period during which its level increases from $D_H$ to $D_S$. The weighted parameter P(Q) is also set as a function indicative of zero for a period during which its level increases from $D_S$ to over $D_S$. Incidentally, the weighted parameters P(S) and Q(S) are correlated as follows:

$$P(S) + Q(S) = 1 \tag{1}$$

Each of the unsharp signals U generated by the unsharp signal generator unit 24 and the weighted parameter P(S) from the look-up table 26 ar multiplied by a multiplier 30, followed by supply of the result to an adder 32. Then, multiplication of each one of the image signals S and the weighted parameter Q(S) from the look-up table 26 is performed by a multiplier 34, followed by supply of the result to the adder 32. Each of image signals T as an output from the adder 32 is supplied to the halftone dot image signal generator unit 28. At this time, the halftone dot image signal generator unit 28 generates each of halftone dot image signals R from the total image signal T and then sends the same to the image recording unit 22.

The image reading and recording system 10 to which the image processing apparatus according to the present embodiment is applied is basically constructed as described above. A description will next be made on operation of the system.

First of all, the CCD 14 serves to scan each of continuous-tone images recorded on the original G fed in the auxiliary scanning direction indicated by the arrow A in the main scanning direction indicated by the arrow B through the beam-condensing optical system 12, and then convert the scanned images into electric signals. Then, each of the continuous-tone images, which have been converted into the electric signals, is converted into a digital signal by the A/D converter 18 based on the main scanning clock signal $\phi_X$ from the clock generator 16 so as to obtain each of image signals S. The image signal S is transferred to the image processing unit 20, and then supplied therefrom to the unsharp signal generator unit 24, the look-up table 26 and the multiplier 34 successively (see FIG. 2).

At this time, each unsharp signal U is generated based on each image signal S at the unsharp signal generator unit 24. Namely, where it is desired to one-dimensionally average the image signals only in the main scanning direction by way of example, even pairs of image signals $S_K$ adjacent to one another along the main scanning direction, out of a plurality of image signals S produced by a plurality of photoelectric converter unit constituting the CCD 14, are added together and then averaged, to thereby produce the total unsharp signal $U_i$ expressed by the following equation from the unsharp signal generating unit 24.

$$U_i = \frac{1}{2N} \sum_{K=i-N}^{i+N} S_K \quad (2)$$

Where it is desired to two-dimensionally average the image signals S in both main and auxiliary directions, even pairs of image signals $S_{KL}$ adjacent to one another in the two-dimensional direction are added together and then averaged. As a consequence, the total unsharp signal $U_{ij}$ is produced according to the following equation:

$$U_{ij} = \frac{1}{(2N)^2} \sum_{k=i-N}^{i+N} \sum_{L=j-N}^{j+N} S_{KL} \quad (3)$$

The CCD 14 is generally provided with two transfer registers. The image processing is rendered high-speed by taking out image signals one every other signal from each one of the photoelectric converter units constituting the CCD 14 and then transferring the image signals thus taken using these transfer registers. Thus, if the unsharp signal U ($U_i$ or $U_{ij}$) is produced based on even pairs of the image signals S in accordance with the above-described equations (2) and (3), a preferred unsharp signal U obtained by averaging irregularity in outputs caused by the difference in property between the two transfer registers can be achieved.

Figure 3:
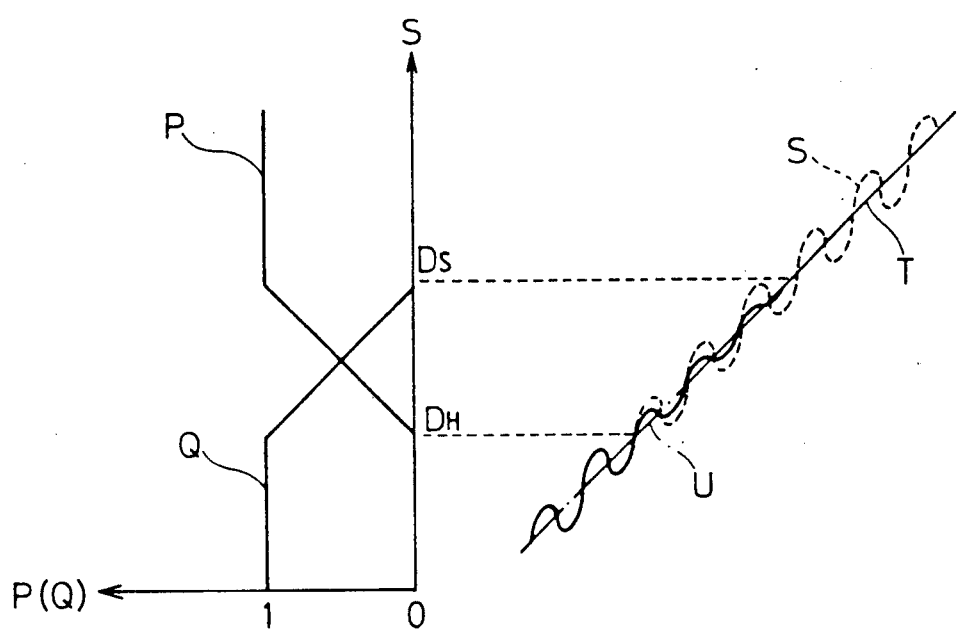
FIG. 3 is a diagram for describing the relationship between each of weighted parameters established on a look-up table depicted in FIG. 2 and each of image signal obtained by the parameters.

On the other hand, the look-up table 26 serves to select the weighted parameters P(S) and Q(S) with characteristics shown in FIG. 3 according to each image signal S, and to supply the same to the multiplier 30 and 34 respectively. At this time, the multiplier 30 serves to perform multiplication of the unsharp signal U and the weighted parameter P(S) for supplying the multiplied result to the adder 32. The multiplier 34 also serves to carry out multiplication of each image signal S and the weighted parameter Q(S) for supplying the multiplied result to the adder 32. Then, the adder 32 adds these signals together and then supplies the total image signal T as the added result determined by the following equation to the halftone dot image signal generator unit 28.

$$T = P(S) \cdot U + Q(S) \cdot S \quad (4)$$

The halftone dot image signal generator unit 28 generates a halftone dot image signal R based on the image signal T, and supplies the same to the image recording unit 22. Then, the image recording unit 22 serves to form a halftone dot image on the photographic film F based on the halftone dot image signal R.

Figure 4:
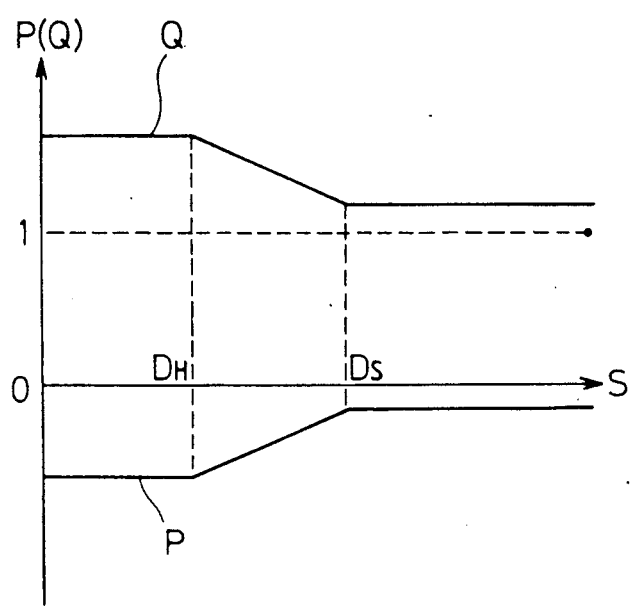
FIG. 4 is a diagram for describing another embodiment of the weighted parameters which are to be established on the look-up table shown in FIG. 2.

Here, if the level of each image signal S is within the highlight, i.e., the lightest spot or area ranging from zero to $D_H$, P(S) and Q(S) are equal to zero and one respectively [P(S)=0, Q(S)=1]. Thus, the image signal T becomes equal to S judging from the equation (4). A image signal T is therefore supplied to the halftone dot image signal generator unit 28 without processing of the same for average. Accordingly, the image which appears on the side of the highlight is recorded on the photographic film F without any reduction of resolution. On the other hand, if the level of each image signal S is within a shadow area having range from $D_S$ to over $D_S$, P(S) and Q(S) are equal to one and zero respectively [P(S)=1, Q(S)=0]. Thus, the image signal T becomes to U from the equation (4). As a consequence, an averaged image signal T is supplied to the halftone dot image signal generator unit 28. Accordingly, the image which appears pears on the side of the shadow area is recorded on the photographic film F, with the influence of noise suitably lessened. In this case, the reduction in resolution does not give rise to a problem because the image appears on the side of the shadow area. Further, if the level of each of the image signals S falls within the range from $D_H$ to $D_S$, P(S) gradually increases from zero, while Q(S) gradually decreases from 1. The image signal T is gradually processed for average as the level of each image signal S becomes greater. As a consequence, images which have gradually averaged and formed over the range from the highlight to the shadow area of the level of each image signal S are produced on the photographic film F.

Where the weighted parameters P(S) and Q(S) are now established, as shown in FIG. 4, under the conditions of the following expressions:

$$P(S) < 0 \quad (5)$$

$$Q(S) > 1.0 \quad (6)$$

$$P(S) + Q(S) = 1 \tag{7}$$

The sharpness emphasis processing of each image signal S can be performed using the same circuit construction. Namely, if the following equation is established taking the sharpness parameter as K, the sharpness emphasis processing of each image signal S can be performed.

$$T = S + K(S - U) \tag{8}$$

In this case, the above equation (8) can be derived from the equation (4) by replacing $P(S)$ with $-K$ and $Q(S)$ with $1+K$ respectively as expressed by the following equations:

$$P(S) = -K \tag{9}$$

$$Q(S) = 1 + K \tag{10}$$

Accordingly, where the weighted parameters P(S) and Q(S) are established in the above-described manner, an image having high sharpness can be obtained on the side of the highlight, while an image with the sharpness which is not so high can be obtained on the side of the shadow area.

Figure 5:
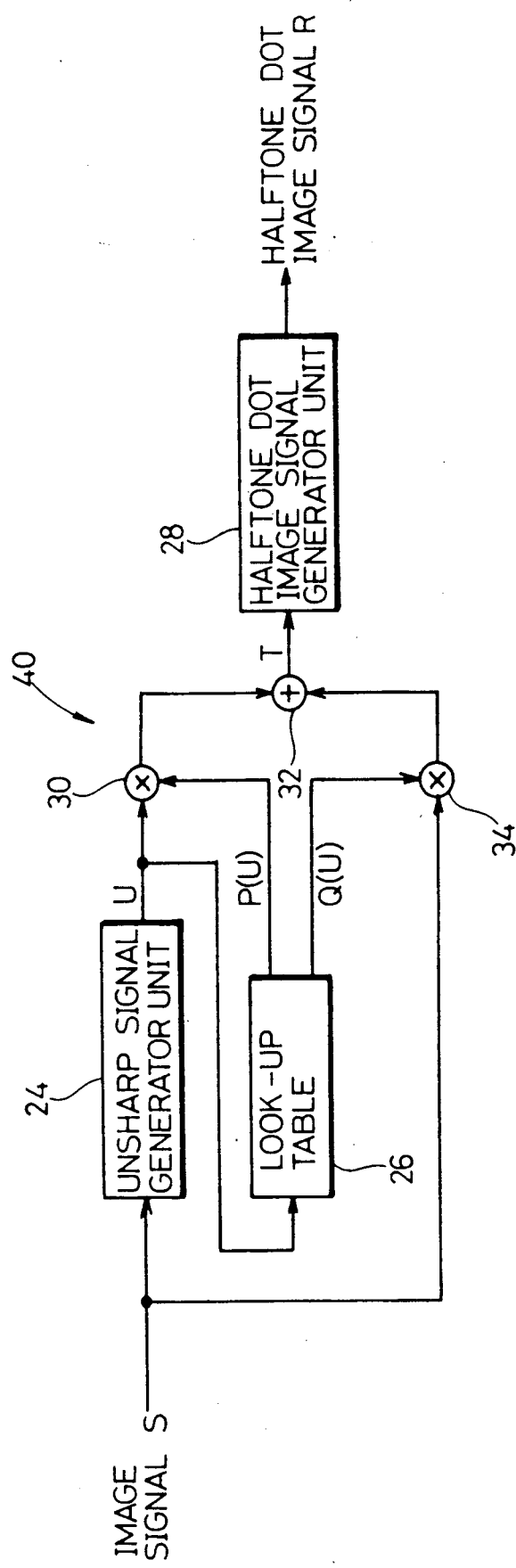
FIG. 5 is a block diagram illustrating the construction of another embodiment of the image processing unit shown in FIG. 1.

FIG. 5 illustrates another embodiment of the image processing unit 20 shown in FIG. 2. Designated at numeral 40 is an image processing unit, which in turn serves to select weighted parameters P(U) and Q(U) established on a look-up table 26 based on each of unsharp signals U outputted from an unsharp signal generator unit 24, and to supply the selected parameter to multipliers 30 and 34. At this time, the weighted parameters P(U) and Q(U) are selected from the look-up table 26 based on the averaged unsharp signal U. The total image signal T is determined according to the following equation:

$$T = P(U) \cdot U + Q(U) \cdot S \tag{11}$$

Accordingly, for example, even in the case where each image signal S, as noise, having the level of low density is read on the side of the shadow area of an image, Q(U) becomes zero [Q(U)=0], and hence the image signal T determined based on the equation (11) becomes an averaged signal. As a result, the image signal T becomes a signal free from influence of the noise.

According to the present invention, as has been described above, each image signal and each unsharp signal produced by the image signal referred to above are mixed together using a weighted parameter to be selected depending on the density level of an image so as to obtain a new image signal. At this time, when one attempts to reproduce an image using the new image signal, an image on which average processing has most unartificially been effected over the range from the shadow area to the highlight can be obtained. As a result, the visible level of noise included in the image is reduced and no reduction in resolution also develop on the side of the highlight.

Having now fully described the invention, it will be apparent to those skilled in the art that many changes and modifications can be made without departing from the spirit or scope of the invention as set forth herein.

What is claimed is:

1. An image processing apparatus, comprising:
unsharp signal generating means for processing a plurality of image signals obtained from continuous-tone images by averaging said image signals so as to generate an unsharp signal;
weighted parameter generating means for generating weighted parameters P and Q according to a level of each of said image signals or a level of said unsharp signal; and
image signal producing means for producing a new image signal T in accordance with the following equation:

$$T = P \cdot U + Q \cdot S$$

where
S is an image signal
U is an unsharp signal
P and Q are weighted parameters.

2. An apparatus according to claim 1, wherein said unsharp signal generating means comprises an addition averaging circuit for adding said plurality of image signals corresponding to an even number of pixels arranged to form a continuous-tone image to be scanned in a main scanning direction and for averaging the added signals to thereby generate said unsharp signal.

3. An apparatus according to claim 1, wherein said unsharp signal generating means comprises an addition averaging circuit for adding said plurality of image signals corresponding to the even number of pixels arranged to form a continuous-tone image to be scanned in a main scanning direction and an additional plurality of image signals corresponding to an even number of pixels arranged to form a continuous-tone image to be scanned in an auxiliary scanning direction and for averaging the added signals to thereby generate said unsharp signal.

4. An apparatus according to any one of claims 1, through 3, wherein said weighted parameter generating means comprises a look-up table of a type wherein the weighted parameter P is established such that parameter Q indicates zero as long as the level of each of the image signals increases from zero to a certain value $D_H$ on the side of a highlight, parameter P gradually approaches one as long as said level increases from the certain value $D_H$ to a certain value $D_S$ on the side of a shadow area and parameter P indicates one as long as said level increases from the certain value $D_S$ to over $D_S$, and the weighted parameter Q is established such that parameter Q indicates one as long as the level of each of the image signals increases from zero to the certain value $D_H$, parameter Q gradually approaches zero as long as said level increases from the certain value $D_H$ to the certain value $D_S$ and parameter Q indicates zero as long as said level increases from the certain value $D_S$ to over $D_S$, whereby the weighted parameters P and Q are selected depending on the level of each of the image signals.

5. An apparatus according to any one of claims 1 through 3, wherein said weighted parameter generating means comprises a look-up table of a type wherein the weighted parameter P is established such that parameter P indicates zero as long as the level of said unsharp signal increases from zero to a certain value $D_H$ on the side of a highlight, parameter P gradually approaches one as long as said level of said unsharp signal increases from the certain value $D_H$ to a certain value $D_S$ on the side of a shadow area and parameter P indicates one as long as said level increases from the certain value $D_S$ to over $D_S$, and the weighted parameter Q is established such that parameter Q indicates one as long as the level of increases from zero to the certain value $D_H$, parameter Q gradually approaches zero as long as said level increases from the certain value $D_H$ to the certain value $D_S$ and parameter Q indicates zero as long as said level increases from the certain value $D_S$ to over $D_S$, whereby the weighted parameters P and Q are selected depending on the level of said unsharp signal.

6. An apparatus according to any one of claims 1 through 3, wherein said weighted parameter generating means comprises a look-up table for establishing the weighted parameters P and Q as expressed by the following equations and for selecting the weighted parameters P and Q according to each image signals, $$P(S) = -K$$

$$Q(S) = 1 + K$$

where K is a sharpness parameter of an image signal S.

* * * * *